(12) United States Patent
Cambron et al.

(10) Patent No.: US 7,620,154 B2
(45) Date of Patent: Nov. 17, 2009

(54) EQUIVALENT WORKING LENGTH DETERMINATIVE SYSTEM FOR DIGITAL SUBSCRIBER LINE CIRCUITS

(76) Inventors: G. Keith Cambron, 1031 Seneca Ct., Walnut Creek, CA (US) 94598; David L. Kimble, 417 Pinecone Dr., Danville, CA (US) 94526; Clifford E. Yackle, 16207 W. Dorman Dr., Austin, TX (US) 78717; Richard D. Hart, 4420 Catalpa Ct., Concord, CA (US) 94521

( * ) Notice: Subject to any disclaimer, the term of this patent is extended or adjusted under 35 U.S.C. 154(b) by 259 days.

(21) Appl. No.: 10/328,278

(22) Filed: Dec. 23, 2002

(65) Prior Publication Data

US 2004/0120470 A1    Jun. 24, 2004

(51) Int. Cl.
H04M 1/24 (2006.01)
H04M 3/08 (2006.01)
H04M 3/22 (2006.01)

(52) U.S. Cl. .................. 379/1.04; 379/1.03; 379/22; 379/24

(58) Field of Classification Search ............... 379/1.01, 379/1.03, 1.04, 21, 22, 22.01, 22.02, 22.03, 379/22.04, 22.08, 23, 24, 27.01, 30
See application file for complete search history.

(56) References Cited

U.S. PATENT DOCUMENTS

| | | | |
|---|---|---|---|
| 4,156,867 A | | 5/1979 | Bench et al. |
| 4,312,070 A | | 1/1982 | Coombes et al. |
| 4,394,642 A | | 7/1983 | Currie et al. |
| 4,630,228 A | * | 12/1986 | Tarczy-Hornoch et al. .... 702/59 |
| 4,691,176 A | | 9/1987 | Hsiung et al. |
| 4,756,007 A | | 7/1988 | Qureshi et al. |
| 4,829,526 A | | 5/1989 | Clark et al. |
| 4,833,693 A | | 5/1989 | Eyuboglu |
| 4,901,319 A | | 2/1990 | Ross |
| 4,910,794 A | | 3/1990 | Mahany |

(Continued)

FOREIGN PATENT DOCUMENTS

EP    0 695 100 A2    1/1996

(Continued)

OTHER PUBLICATIONS

Wikipedia, "closed-form expression", obtained from http://en.wikipedia.org/wiki/Closed-form_expression on Mar. 12, 2009.*

(Continued)

Primary Examiner—Quoc D Tran

(57) ABSTRACT

An equivalent working length (EWL) determinative system (11) for use in a digital subscriber line (DSL) telecommunication network (10) is provided. The EWL system (11) includes a DSL circuit (32) having a customer site (14) with customer premises equipment (30). The customer premises equipment (30) receives and transmits communication signals and generates a first attenuation signal in response to the communication signals. A remote terminal (20) forms a loop (31) with the customer site (14) and has a loop length. The remote terminal (20) includes a remote terminal transceiver (40) that is in communication with the customer premises equipment (30). A main controller (37) is electrically coupled to the customer premises equipment (30) and determines an EWL of the loop (31) in response to the first attenuation signal. A method of performing the same is also provided.

14 Claims, 2 Drawing Sheets

U.S. PATENT DOCUMENTS

| | | |
|---|---|---|
| 4,956,852 A | 9/1990 | Hodge |
| 5,048,054 A | 9/1991 | Eyuboglu et al. |
| 5,052,000 A | 9/1991 | Wang et al. |
| 5,056,105 A | 10/1991 | Darmon et al. |
| 5,140,625 A | 8/1992 | Reum et al. |
| 5,202,905 A | 4/1993 | Sakamoto et al. |
| 5,249,224 A | 9/1993 | Chambers |
| 5,258,713 A | 11/1993 | Rosch et al. |
| 5,263,051 A | 11/1993 | Eyuboglu |
| 5,274,667 A | 12/1993 | Olmstead |
| 5,287,556 A | 2/1994 | Cahill |
| 5,335,247 A | 8/1994 | Olmstead |
| 5,384,782 A | 1/1995 | Elms |
| 5,425,051 A | 6/1995 | Mahany |
| 5,425,052 A | 6/1995 | Webster et al. |
| 5,483,676 A | 1/1996 | Mahany et al. |
| 5,500,879 A | 3/1996 | Webster et al. |
| 5,504,736 A | 4/1996 | Cubbison, Jr. |
| 5,513,213 A | 4/1996 | Patel et al. |
| 5,515,398 A | 5/1996 | Walsh et al. |
| 5,541,955 A | 7/1996 | Jacobsmeyer |
| 5,657,342 A | 8/1997 | Olmstead |
| 5,671,250 A | 9/1997 | Bremer et al. |
| 5,683,432 A | 11/1997 | Goedeke et al. |
| 5,715,277 A | 2/1998 | Goodson et al. |
| 5,726,765 A | 3/1998 | Yoshida et al. |
| 5,751,338 A | 5/1998 | Ludwig, Jr. |
| 5,802,446 A | 9/1998 | Giorgi et al. |
| 5,812,786 A | 9/1998 | Seazholtz et al. |
| 5,848,150 A | 12/1998 | Bingel |
| 5,867,494 A | 2/1999 | Krishnaswamy et al. |
| 5,870,429 A | 2/1999 | Moran, III et al. |
| 5,930,310 A | 7/1999 | Freeman |
| 5,974,139 A | 10/1999 | McNamara et al. |
| 5,982,768 A | 11/1999 | Bellenger et al. |
| 5,987,061 A | 11/1999 | Chen |
| 5,987,069 A | 11/1999 | Furukawa et al. |
| 5,991,269 A | 11/1999 | Williamson et al. |
| 5,995,567 A | 11/1999 | Cioffi et al. |
| 6,002,671 A | 12/1999 | Kahkoska et al. |
| 6,014,412 A | 1/2000 | Wiese et al. |
| 6,044,107 A | 3/2000 | Gatherer et al. |
| 6,052,420 A | 4/2000 | Yeap et al. |
| 6,055,268 A | 4/2000 | Timm et al. |
| 6,055,297 A | 4/2000 | Terry |
| 6,058,162 A | 5/2000 | Nelson et al. |
| 6,067,646 A | 5/2000 | Starr |
| 6,073,179 A | 6/2000 | Liu et al. |
| 6,078,662 A | 6/2000 | Denedios |
| 6,081,291 A | 6/2000 | Ludwig, Jr. |
| 6,091,713 A * | 7/2000 | Lechleider et al. ........... 370/248 |
| 6,151,335 A | 11/2000 | Ko et al. |
| 6,163,599 A | 12/2000 | McHale |
| 6,177,801 B1 | 1/2001 | Chong |
| 6,181,775 B1 | 1/2001 | Bella |
| 6,209,108 B1 | 3/2001 | Pett et al. |
| 6,212,229 B1 | 4/2001 | Salinger |
| 6,219,378 B1 | 4/2001 | Wu |
| 6,246,695 B1 | 6/2001 | Seazholtz et al. |
| 6,256,377 B1 * | 7/2001 | Murphree et al. .............. 379/24 |
| 6,266,395 B1 | 7/2001 | Liu et al. |
| 6,272,652 B1 | 8/2001 | Starr |
| 6,278,485 B1 | 8/2001 | Franchville et al. |
| 6,285,708 B1 | 9/2001 | Shively et al. |
| 6,292,468 B1 | 9/2001 | Sanderson |
| 6,292,539 B1 | 9/2001 | Eichen et al. |
| 6,292,559 B1 | 9/2001 | Gaikwad et al. |
| 6,295,313 B1 | 9/2001 | Noma et al. |
| 6,317,495 B1 | 11/2001 | Gaikwad et al. |
| 6,349,130 B1 | 2/2002 | Posthuma et al. |
| 6,389,109 B1 * | 5/2002 | Schmidt et al. ............. 379/1.04 |
| 6,418,160 B1 | 7/2002 | Miller |
| 6,424,657 B1 | 7/2002 | Voit et al. |
| 6,426,946 B1 | 7/2002 | Takagi et al. |
| 6,449,288 B1 | 9/2002 | Chari et al. |
| 6,466,088 B1 | 10/2002 | Rezvani et al. |
| 6,467,092 B1 | 10/2002 | Geile et al. |
| 6,477,238 B1 * | 11/2002 | Schneider et al. ......... 379/22.04 |
| 6,498,791 B2 | 12/2002 | Pickett et al. |
| 6,507,606 B2 | 1/2003 | Shenoi et al. |
| 6,510,184 B1 | 1/2003 | Okamura |
| 6,532,277 B2 | 3/2003 | Ulanskas et al. |
| 6,538,451 B1 | 3/2003 | Galli et al. |
| 6,546,090 B1 | 4/2003 | Bremer et al. |
| 6,546,509 B2 | 4/2003 | Starr |
| 6,549,568 B1 | 4/2003 | Bingel |
| 6,570,855 B1 | 5/2003 | Kung et al. |
| 6,590,893 B1 | 7/2003 | Hwang et al. |
| 6,597,689 B1 | 7/2003 | Chiu et al. |
| 6,598,188 B1 | 7/2003 | Locke et al. |
| 6,608,835 B2 | 8/2003 | Geile et al. |
| 6,614,781 B1 | 9/2003 | Elliott et al. |
| 6,625,255 B1 | 9/2003 | Green et al. |
| 6,636,505 B1 | 10/2003 | Wang et al. |
| 6,640,239 B1 | 10/2003 | Gidwani |
| 6,643,266 B1 | 11/2003 | Pugaczewski |
| 6,647,058 B1 | 11/2003 | Bremer et al. |
| 6,650,697 B1 | 11/2003 | Tate et al. |
| 6,658,052 B2 | 12/2003 | Krinsky et al. |
| 6,667,971 B1 | 12/2003 | Modarressi et al. |
| 6,668,041 B2 * | 12/2003 | Kamali et al. .............. 379/1.04 |
| 6,674,725 B2 | 1/2004 | Nabkel et al. |
| 6,674,749 B1 | 1/2004 | Mattathil |
| 6,680,940 B1 | 1/2004 | Lewin et al. |
| 6,697,768 B2 | 2/2004 | Jones et al. |
| 6,700,927 B1 | 3/2004 | Esliger et al. |
| 6,718,019 B1 * | 4/2004 | Heidari et al. ........... 379/93.05 |
| 6,724,859 B1 | 4/2004 | Galli |
| 6,724,890 B1 | 4/2004 | Bareis |
| 6,725,176 B1 * | 4/2004 | Long et al. ................... 702/183 |
| 6,728,238 B1 | 4/2004 | Long et al. |
| 6,731,678 B1 | 5/2004 | White et al. |
| 6,732,281 B1 | 5/2004 | Mantri et al. |
| 6,735,601 B1 | 5/2004 | Subrahmanyam |
| 6,747,992 B1 | 6/2004 | Matsumoto |
| 6,751,218 B1 | 6/2004 | Hagirahim et al. |
| 6,751,315 B1 | 6/2004 | Liu et al. |
| 6,751,662 B1 | 6/2004 | Natarajan et al. |
| 6,754,261 B1 | 6/2004 | Liu et al. |
| 6,754,283 B1 | 6/2004 | Li |
| 6,762,992 B1 | 7/2004 | Lemieux |
| 6,763,025 B2 | 7/2004 | Leatherbury et al. |
| 6,765,864 B1 | 7/2004 | Natarajan et al. |
| 6,765,918 B1 | 7/2004 | Dixon et al. |
| 6,765,955 B1 | 7/2004 | Davis et al. |
| 6,769,000 B1 | 7/2004 | Akhtar et al. |
| 6,769,024 B1 | 7/2004 | Natarajan et al. |
| 6,771,673 B1 | 8/2004 | Baum et al. |
| 6,775,232 B1 | 8/2004 | Sue et al. |
| 6,775,267 B1 | 8/2004 | Kung et al. |
| 6,775,268 B1 | 8/2004 | Wang et al. |
| 6,775,273 B1 | 8/2004 | Kung et al. |
| 6,778,525 B1 | 8/2004 | Baum et al. |
| 6,782,078 B1 | 8/2004 | Posthuma |
| 6,782,082 B2 | 8/2004 | Rahamim |
| 6,826,258 B2 * | 11/2004 | Afzal ......................... 379/1.04 |
| 6,895,081 B1 * | 5/2005 | Schmidt et al. ............. 379/1.01 |
| 2001/0030998 A1 | 10/2001 | Yong |
| 2001/0040917 A1 | 11/2001 | Kumar et al. |
| 2002/0067802 A1 * | 6/2002 | Smith et al. ................ 379/1.04 |
| 2002/0067824 A1 | 6/2002 | Wang |
| 2002/0075949 A1 | 6/2002 | Banerjea et al. |
| 2002/0075952 A1 | 6/2002 | Verbin et al. |
| 2002/0080886 A1 | 6/2002 | Ptasinski et al. |

| | | | |
|---|---|---|---|
| 2002/0122552 A1* | 9/2002 | Liu | 379/399.01 |
| 2002/0136397 A1 | 9/2002 | Zeng et al. | |
| 2002/0168054 A1 | 11/2002 | Klos et al. | |
| 2002/0176544 A1 | 11/2002 | Liu et al. | |
| 2003/0086362 A1 | 5/2003 | Hasegawa et al. | |
| 2003/0086514 A1 | 5/2003 | Ginis et al. | |
| 2003/0156691 A1 | 8/2003 | Rahamim | |
| 2003/0190937 A1 | 10/2003 | Karmi et al. | |
| 2003/0218984 A1 | 11/2003 | Tanaka | |
| 2004/0095921 A1 | 5/2004 | Kerpez | |
| 2005/0123027 A1 | 6/2005 | Cioffi et al. | |
| 2005/0123028 A1 | 6/2005 | Cioffi et al. | |
| 2005/0138524 A1 | 6/2005 | Cioffi | |

FOREIGN PATENT DOCUMENTS

| | | |
|---|---|---|
| EP | 1 213 669 A2 | 6/2002 |
| GB | 1 382 087 A | 1/1975 |
| GB | 2 173 974 A | 10/1986 |
| WO | WO 99/53647 A1 | 10/1999 |
| WO | WO 01/33823 A1 | 5/2001 |
| WO | WO 02/03152 A2 | 1/2002 |
| WO | WO 02/13009 A1 | 2/2002 |
| WO | WO 03/005598 A1 | 1/2003 |
| WO | WO 99/53637 A1 | 8/2008 |

OTHER PUBLICATIONS

Committee T1 - Telecommunications, Working Group T1E1.4 (J.Cioffi, editor); Dynamic Spectrum Management Report T1E1.4/2003-018RE (T1E1-38), Spectral Compatibility Aspects for Facilities between a Central Office and the Network—to—Customer Interface (Twisted Pair Transmission System); Aug. 10, 2004; Washington, D.C. (77 pgs).
Cioffi, et al., "Low-Latency Impulse Elimination," Committee T1, Working Group T1E1.4 (DSL Access); Atlanta, GA; Apr. 8, 2002 (13 pgs) - Paper (5 pgs) and PowerPoint slides (8 pgs).
Starr, et al., "Information comment solicitation on ITU FEC INP submission for ADSL2, " Committee T1, Working Group T1E1.4 (DSL Access); Vancouver, BC; Feb. 23, 2004 (16 pgs) - Paper (7 pgs) and PowerPoint slides (9 pgs).
Cioffi, "Dynamic Spectrum Management," Broadband World Forum; London, England; Sep. 10, 2003 (17 pgs).
Cioffi, "Dynamic Spectrum Management," Alcatel DSL Forum presentation; Paris, France, Nov. 11, 2003, (47 pgs).
Cioffi, "Dynamic Spectrum Management," Deutsche Telecom DSL presentation; Darmstadt, Germanay; Oct. 6, 2003 (37 pgs).
Cioffi, "Dynamic Spectrum Management," IEEE Globecom presentation; San Francisco, California; Dec. 3, 2003 (30 pgs).
Cioffi, "Dynamic Spectrum Management," Telecom Italia presentation; Turin, Italy; Nov. 19, 2003 (32 pgs).
Cioffi, "Dynamic Spectrum Managment," Korea Telecom DSL presentation, Seoul, Korea; Sep. 24, 2003 (38 pgs).
D. Veithen, et al., " A 70Mb/s Variable-Rate DMT-Based Modem for VDSL,"1999 IEEE International Solid-State Circuits Conference; ISSCC99/Session 14/Paper TP 14.6, Feb. 15.
ITU-T "Recommendation G.992.1" Asymmetric digital subscriber line (ADSL) transceivers, Series G, Jun. 1999, (pp. 226-39, provided by International Searching Authority). Reference No. XP-002321806.
N. Nedev, et al., "Comparison between Interleaving and Multiple DMT Symbols per Respectfully Submits Codeword in ADSL Systems," Globecom 2002 - IEEE Global Telecommunications Conference; Taipei, Taiwan; Nov. 17, 2002 (pp. 2265-2269, as provided by International Searching Authority). Reference No. XP-010636152.
F. Moulin, et al., "Discrete-mulltitone-based ADSL and VDSL systems performance analysis in an impulse noise environment," IEEE Proceedings: Sci. Meas. Technol., vol. 150, No. 6, Nov. 3, 2003 (pp. 273-278, as provided by International Searching Authority). Reference No. XP-006024286.
J. Cioffi, " Unbundled DSL Evolution," ANSI Contribution T1E1.4/2001-088, Feb. 19, 2001 (6 pgs).

J. Cioffi, et al., "Examples Improvements of Dynamic Spectrum Management," ANSI Contribution T1E1.4/2001-088, Feb. 19, 2001 (14 pgs).
J. Cioffi, "Proposal for Study of Dynamic Spectrum Management for the Evolving Unbundling Architecture of DSL," ANSI Contribution T1E1.4/2001-090, Feb. 19, 2001 (3 pgs).
J. Cioffi, et al., "Indication of Capability to Release of Channel Information, " ANSI Contribution T1E1.4/2001-146R1, May 7, 2001 (3 pgs).
J. Cioffi, et al., "Indication of Capability to Release of Channel Information, " ANSI Contribution T1E1.4/2001-146R2, Nov. 5, 2001 (3 pgs).
J. Cioffi, et al., "Channel Identification with Dynamic Spectrum Management," ANSI Contribution T1E1.4/2001-147, May 7, 2001 (8 pgs).
J. Cioffi, et al., "Channel Identification with Dynamic Spectrum Management," ANSI Contribution T1E1.4/2001-147R1, Nov. 5, 2001 (9 pgs). .
J. Cioffi, et al., "Proposed Scope and Mission for DSM(188)," ANSI Contribution T1E1.4/2001-188R2, Aug. 20, 2001 (4 pgs).
J. Cioffi, et al., "Proposed Scope and Mission for DSM( 188)," ANSI Contribution T1E1.4/2001-188R4, Nov. 5, 2001 (4 pgs).
J. Cioffi, et al., "Iterative Waterfilling for Dynamic Spectrum Management," ANSI Contribution T1E1.4/2001-200R3, Aug. 20, 2001, 2001 (14 pgs).
J. Cioffi, et al., "Iterative Waterfilling for Dynamic Spectrum Management," ANSI Contribution T1E1.4/2001-200R.5, Nov. 5, 2001, 2001 (14 pgs).
J. Cioffi, et al., "Indication of Capability to Release of Channel Information," ANSI Contribution T1E1.4/2002-041, May 7, 2001 (3 pgs).
J. Cioffi (Editor), "Draft Sections 1 and 4 proposed, Dynamic Spectrum Management," ANSI Contribution T1E1.4/2002-040R1, Apr. 8, 2002 (3 pgs).
J. Cioffi, et al., "Indication of Capability to Release of Channel Information," ANSI Contribution T1E1.4/2002-041R1, Apr. 8, 2002 (4 pgs).
J. Cioffi, et al., Indication of Capability to Release of Channel Information, ANSI Contribution T1E1.4/2002-041R3, Aug. 19, 2002 (4 pgs).
J. Cioffi, et al., "Autonomous Level 0 DSM Results: iterative -waterfilling for ADSL and VDSL," ANSI Contribution T1E1.4/2002-057, Feb. 18, 2002 (10 pgs).
J. Cioffi, et al., "Autonomous DSM Mixture of Symmetric and Asymmetric Service: Bi-directional Iterative Waterfilling (at Level 0 or at Level 1)., " ANSI Contribution T1E1.4/2002-058R1, Feb. 18, 2002 (9 pgs).
J. Cioffi, et al., Coordinated Level 2 DSM Results: Vectoring of multiple DSLs, ANSI Contribution T1E1.4/2002-059, Feb. 18, 2002 (8 pgs).
K. Kerpez, et al., "Response to 2001-273R1 using Telcordia DSL Analysis," ANSI Contribution T1E1.4/2002-063R1, Feb. 18, 2002 (3 pgs).
J. Cioffi, et al., "Response to 2001-273R1 using measured Verizon DSL SNRs," ANSI Contribution T1E1.4/2002-069, Feb. 18, 2002 (15 pgs).
J. Cioffi, et al., New Technology' in Spectrum Management, ANSI Contribution T1E1.4/2002-128, Apr. 8, 2002 (2 pgs).
J. Cioffi, et al., "10MDSL Beyond All Goals, and Spectrally Compatible with ADSL and VDSL, form CO or RTs," ANSI Contribution T1E1.4/2002-129, Apr. 8, 2002 (10 pgs).
J. Cioffi, et al., "Some proposed Section 7.1 text for ADSL fixed-margin mode," ANSI Contribution T1E1.4/2002-176, Aug. 19, 2002 (3 pgs).
J. Cioffi, et al., "Some proposed Section 7.1 text for ADSL fixed-margin mode," ANSI Contribution T1E1.4/2002-176R1, Nov. 18, 2002 (13 pgs).
J. Cioffi, et al., "Proposed 'Stretch Goals' for 10MDSL," ANSI Contribution T1E1.4/2002181, Aug. 19, 2002 (6 pgs).
J. Cioffi, et al., "Proposed 'Stretch Goals' for 10MDSL," ANSI Contribution T1E1.4/2002181R1, Aug. 19, 2002 (7 pgs).
K. Kerpez, "Jointly Optimizing DSL Spectra," ANSI Contribution T1E1.4/2002-231, Nov. 18, 2002 (12 pgs).

A. Leshem, " Dynamic FDM and Dynamic DS Power Back-Off: A Simplified DSM Algorithm for Coexistence between RT and CO based deployments," ANSI Contribution T1E1.4/2002-284, Nov. 17, 2002 (9 pgs).

Yu, et al, "On Constant-Power Waterfilling," IEEE International Conference on Communications, (ICC), Jun. 2001 (5 pgs).

Yu, et al., "Iterative Water-filling for Vector Multiple Access Channels," IEEE International Symposium on Information Theory (ISIT), Jun. 2000 (1 pg).

Yu, et al., "Competitive Equilibrium in the Gaussian Interference Channel," IEEE International Symposium on Information Theory (ISIT), Jun. 2000 (1 pg).

Yu, et al., "Distributed Multiuser Power Control for Digital Subscriber Lines," IEEE Journal on Selected Areas in Communications, vol. 20, No. 5, pp. 1105-1115; Jun. 2002 (11 pgs).

W. Rhee, "Multiuser Wireless Communications with Multiple Antennas," Dissertation Submitted to the Department of Electrical Engineering and the Committee on Graduate Studies of Stanford University, Jun. 2002 (129 pgs).

W. Yu, "Competition and Cooperation in Multi-user Communication Environments," Dissertation Submitted to the Department of Electrical Engineering and the Committee on Graduate Studies of Stanford University, Jun. 2002 (120 pgs).

Communication Pursuant to Article 96(2) EPC, Jun. 26, 2006, International Application No. 01924405.2, European Patent Office (8 pgs).

Communication Pursuant to Article 96(2) EPC, Nov. 15, 2007, International Application No. 01924405.2, European Patent Office (3 pgs).

* cited by examiner

EQUIVALENT WORKING LENGTH DETERMINATIVE SYSTEM FOR DIGITAL SUBSCRIBER LINE CIRCUITS

TECHNICAL FIELD

The present invention relates generally to data transmission systems, and more particularly, to an apparatus and method of determining equivalent working length of a digital subscriber line circuit.

BACKGROUND OF THE INVENTION

Digital subscriber line (DSL) technology provides high-speed data transmission over a so-called "last mile" of "local loop" of a telephone network via copper twisted wire pair cable between residential and small business sites and telephone company central offices and remote terminals. There are various types of DSL such as asymmetric DSL, high bit-rate DSL, single-line DSL, very-high-data-rate DSL, integrated services digital network DSL, and rate-adaptive DSL having various transmission rates, switched circuit characteristics, and other known operation characteristics. These are collectively referred to as XDSL technologies.

In a simplified general view, a DSL system may be considered as a pair of communicating modems, one of which is located at a home or office computer, and the other of which is located at a network control site, typically at a telephone company central office or a remote terminal. The central office or remote terminal modem is connected to some type of network, usually referred to as a backbone network, which is in communication with other communication paths by way of routers or digital subscriber line access multiplexers (DSLAMs). Through DSLAMs the backbone network is able to communicate with dedicated information sources and with the Internet. As a result, information accessible to the backbone network may be communicated between the central office or remote terminal modem and a customer site modem.

DSL applications may be served from central office and remote terminal locations by up to approximately 17,000 feet of copper twisted wire pair cable that may exist between the DSLAM equipment at a central office or remote terminal and a DSL modem at a customer site.

The twisted wire pair cable has been characterized by a length measurement known as Equivalent Working Length (EWL). EWL is used to determine insertion loss of a loop and thus determining a service information rate that can be supported by a loop corresponding with a pair of twisted wire cable. Determination of EWL is useful in installation of a customer site. EWL is defined by international and national standards.

An EWL can be determined given knowledge of loop makeup parameters including lengths, gauges, and positions of all splices and bridged taps. Loop facility assignment center system (LFACS) databases exist for storing the loop makeup parameters and loop characteristics. Loop parameters and characteristics include distances between "poles" and customer sites and distribution makeup such as style, type, and gauge of wire. Loop parameters and characteristics have routinely not been recorded, such that estimation or determination of loop length from database records would generate an inaccurate value. Therefore, inaccuracies in estimation of EWL exist in current loop determinative systems, using information contained in LFACS databases.

Currently one EWL determinative system that is used to determine loop length, and is referred to as a mechanized loop testing (MLT) system, includes a single-ended MLT switch. The MLT test system uses known capacitance properties of a copper loop and attaches a testhead to a working circuit and measures tip-to-ground and ring-to-ground capacitance from which loop length is derived. However, the MLT test system is incapable of accounting for gauge of wire used in a loop and thus cannot accurately determine EWL of the loop. Cable gauges may vary within a DSL circuit. Cable gauges typically range from 19 to 26, each having markedly differing EWL that cannot be determined by the MLT test system. Differences between EWL and measured loop lengths, from the MLT test system, can routinely be approximately 20% or more.

Another EWL determinative system uses training cycle of a baseband modem to infer electrical properties of the loop at high frequencies. This method has been referred to as a "Sapphyre" loop qualification system. The Sapphyre loop qualification system requires deployment of specialized equipment such as a voiceband modem to acquire measurements and determine whether a customer site is capable of receiving ADSL, which requires interaction between a telephony application and a customer so as to perform required measurements and tests. When a customer site is ADSL capable an ADSL modem is installed at the customer site.

An alternative EWL determinative method has been suggested including performing a single-ended capacitance measurement to determine high frequency insertion loss of a loop. This method requires that a loop be removed from service and specialized test access hardware and software be installed within a central office. A disadvantage with performing a single-ended capacitance measurement is that cable gauge size cannot be determined since cables of different gauges have similar capacitance values, making them difficult to distinguish between. Different gauged cable experience different amounts of insertion loss. Also, for a loop that is electrically coupled to a bridged tap, false capacitance values may be measured. When a capacitance measurement is performed, capacitance of the loop including cable coupled to a bridged tap is measured, causing an incorrect capacitance measurement. Thus, the above-described EWL determinative method is incapable of accurately determining insertion loss for a loop.

Also, the EWL of ADSL circuits that are served from remote terminals, terminals at potentially large distances from central offices and between central offices and customer sites, cannot be measured without installation of specialized test equipment at a site of the remote terminal. Installation of the specialized equipment at the remote terminal site is time consuming and costly.

The above-proposed EWL determinative systems and method measure insertion loss of high frequency signals indirectly. The EWL determinative systems cannot measure it directly since they do not have instrumentation at both ends of the loop under test. Although, the above-mentioned EWL determinative method uses instruments at both ends of a loop it measures the loss at low-frequency voiceband of approximately 3 kHz, instead of at an ADSL frequency band. As with capacitance measurements, cable length and gauge cannot be accurately determined by measuring insertion loss at the low-frequency voiceband.

It would therefore be desirable to develop a system and method of determining loop length that supports ADSL circuits, performs measurements at ADSL frequencies, does not require use of specialized equipment beyond the ADSL equipment required for regular deployment, and does not require a priori information pertaining to circuit loop makeup.

DETAILED DESCRIPTION OF THE PREFERRED EMBODIMENT

Figure 1:
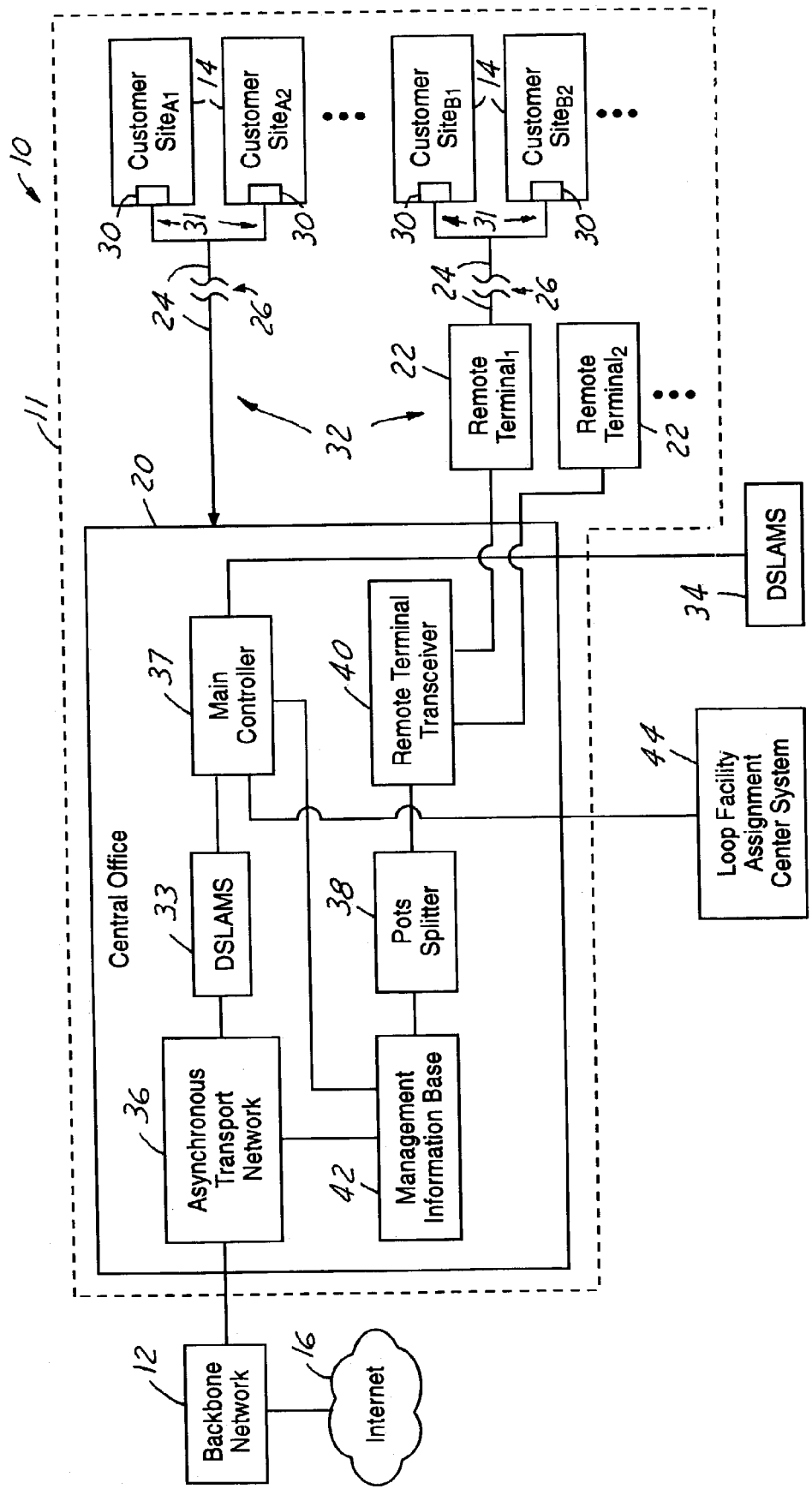
FIG. 1 is a block diagrammatic view of a digital subscriber line (DSL) telecommunication network utilizing an equivalent working length determinative system in accordance with an embodiment of the present invention.

In each of the following figures, the same reference numerals are used to refer to the same components. While the present invention is described with respect to an apparatus and method of determining equivalent working length (EWL) of a digital subscriber line (DSL) circuit, the present invention may be adapted to be used in various communication systems including: telecommunication systems, DSL systems, high-speed data transmission systems, or other communication systems.

In the following description, various operating parameters and components are described for one constructed embodiment. These specific parameters and components are included as examples and are not meant to be limiting.

Also, in the following description the terms "loop" and "DSL circuit" may refer to any telecommunication signal path medium. Loop and DSL circuit may refer to or include various telecommunication cables such as fiber optic cable or copper twisted wire pair cable. Loop and DSL circuit may also refer to or include telecommunication devices located along a telecommunication signal path including central offices, remote terminals, customer terminals, cables, and other telecommunication devices.

The present invention provides an EWL determinative system for use in a DSL telecommunication network. The EWL system includes a DSL circuit having a customer site with customer premises equipment. The customer premises equipment receives and transmits communication signals and generates a first attenuation signal in response to the communication signals. A remote terminal forms a loop with the customer site and has a loop length. The remote terminal includes a remote terminal transceiver that is in communication with the customer premises equipment. A main controller is electrically coupled to the customer premises equipment and determines an EWL of the loop in response to the first attenuation signal. A method of performing the same is also provided.

One of several advantages of the present invention is that it utilizes existing ADSL circuitry to determine EWL of an ADSL circuit. The present invention is non-intrusive and does not require use of specialized equipment for determining EWL.

Another advantage of the present invention is that it provides EWL by performing measurements at ADSL frequencies.

Furthermore, the present invention is capable of determining EWL without use of a priori information pertaining to circuit loop makeup.

Referring now to FIG. 1, a block diagrammatic view of a digital subscriber line (DSL) telecommunication network 10 utilizing an EWL determinative system 11 in accordance with an embodiment of the present invention is shown. The DSL network 10 includes a backbone network 12 and multiple customer sites 14. The DSL INT network 10 routes DSL communication signals between the backbone network 12 and the customer sites 14. The backbone network 12 may be electrically coupled to the Internet 16 and is electrically coupled to at least one central office 20 which, in turn, may be electrically coupled to multiple remote terminals 22. The central office 20 may be directly coupled to the customer sites 14 or indirectly coupled to the customer sites 14 via the remote terminals 22. The central office 20 and the remote terminals 22 are electrically coupled to the customer sites 14 through use of cables 24. The customer sites 14 may be long distances from the remote terminals 22, which are represented by breaks 26. The cables 24 may be twisted wire pair cable, unshielded twisted pair (UTP) cable, fiber optic cable, or other cable known in the art.

The customer sites 14 may be residential or commercial sites. The customer sites 14 having customer premises equipment 30, which may include a modem, a splitter, a network interface card, or other customer premises equipment known in the art. The customer premises equipment 30 has an associated customer profile. The customer profile includes various customer performance parameters such as an operating code, a signal-to-noise ratio, a line capacity, an attenuation value, an error rate, and other performance parameters known in the art.

The central office 20 and the remote terminals 22 form loops 31 and DSL circuits 32 with the customer sites 14, each loop having a length. The central office 20 and the remote terminals 22 may be located in a suburban/rural environment or may be located in a more urban environment. The central office 20 and the remote terminals 22 may contain internal DSL access multiplexer (DSLAM) equipment 33, be electrically coupled to external DSLAMs 34, or a combination thereof, to provide DSL service. The DSLAMs 33 may be coupled to the backbone network 14 via an asynchronous transport network 36, as known in the art.

The central office 20 may be a remote terminal or other form of terminal known in the art. The central office 20 includes a main controller 37, which is in communication with the customer premises equipment 30 via a pots splitter 38 and a remote terminal transceiver 40. The main controller 37 is also electrically coupled to a management information base 42. The management information base 42 stores attenuation values for each loop 31.

The main controller 37 is preferably microprocessor-based such as a computer having a central processing unit, memory (RAM and/or ROM), and associated input and output buses. The main controller 37 may also be in the form of a workstation containing ADSL engineering performance tool (ADEPT) software. The main controller 37 may be integrally part of a single unit, be a separate stand-alone device, or be part of the customer sites 14, the remote terminals 22, or the central office 20, as shown. The main controller 37 may also be electrically coupled to various DSLAMs and servers.

The main controller 37 determines EWLs of the loops 31. The EWLs of the loops 31 may be stored, for future use and for other system access availability, in a loop facility assignment center system 44. The loop facility assignment center system 44 stores equivalent working length values for various loops 31 and DSL circuits 32 for utilization by various systems, as known in the art.

Figure 2:
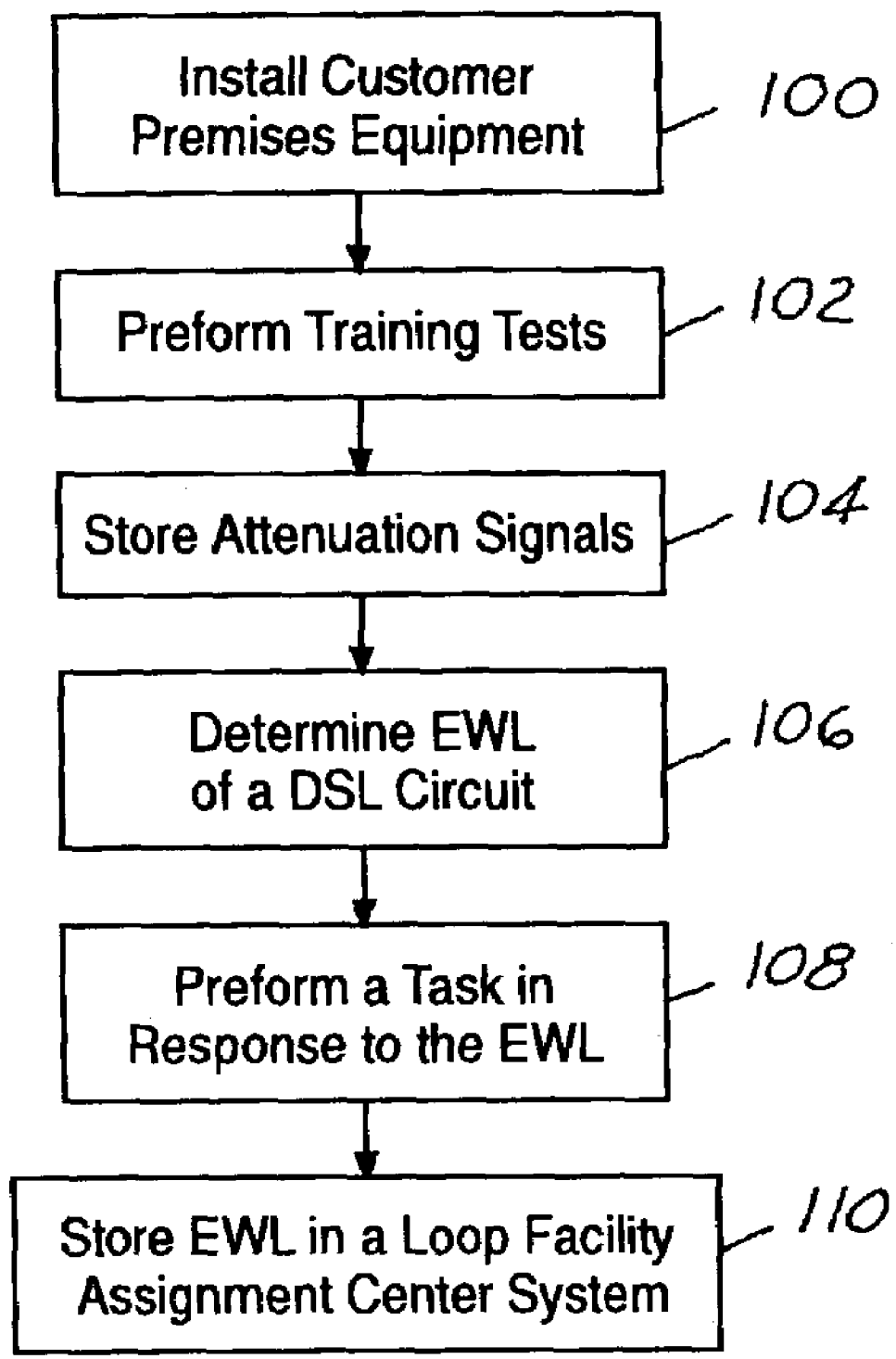
FIG. 2, is a logic flow diagram illustrating a method of determining equivalent working length of a DSL circuit in accordance with an embodiment of the present invention.

Referring now to FIG. 2, a logic flow diagram illustrating a method of determining equivalent working length of a DSL circuit 32 in accordance with an embodiment of the present invention is shown.

In step 100, customer premises equipment 30 is installed at a customer site 14 including an xDSL modem, such as an ADSL modem. The customer premises 'equipment 30 is then in communication with the central office 20.

In step 102, the customer premises equipment 30 and the remote terminal transceiver 40 perform training tests, which include generating a first attenuation signal for downstream communication and a second attenuation signal for upstream communication, respectively, in response to the DSL communication signals. The customer premises equipment 30 and the remote terminal transceiver 40 in generating the first attenuation signal and the second attenuation signal monitor approximately 100 KHz attenuation measurements of the DSL communication signals.

In step 104, the first attenuation signal and the second attenuation signal are stored in the management information base 42.

In step 106, the main controller 37 determines an EWL of a DSL circuit 32 of interest in response to the first attenuation signal and the second attenuation signal. The main controller 37 determines an EWL unshielded twisted pair (UTP) 26-gauge cable representation of the DSL circuit of interest. The main controller 37 utilizes the following linear closed form expression to determine the EWL:

$$EWL=-0.662+0.338A \quad (1)$$

where A is an attenuation value. The attenuation value A may be determined from the first attenuation signal, the second attenuation signal, or a combination thereof. The first attenuation signal and the second attenuation signals may be averaged or determined over time to generate a single attenuation value corresponding to the DSL circuit of interest.

The EWL UTP 26-gauge cable representation provides a basis by which loop attenuation values are easily compared and evaluated. The present invention eliminates the need to determine gauge of cable within a DSL circuit, as with prior art systems. The present invention by determining EWL UTP 26-gauge cable representations allows DSL circuits having varying parameters, characteristics, and makeups to be distinguished between each other without necessarily initially having any of the above-stated DSL circuit information.

Of course, the constant slope value 0.338 and the constant intercept value −0.662, of expression (1), are approximations and other constant values may be used. Also, expression (1) may be altered to account for additional parameters or circuit characteristics known in the art.

In step 108, the main controller 37 performs a task in response to the determined EWL. The main controller 37 may indicate a loop error signal when the attenuation value A is greater than a predetermined attenuation value in response to the determined EWL. The loop error signal may contain information such as a filter is missing or operating inappropriately, a bridge exists on the loop, or some other error known in the art. The main controller 37 may adjust transmission rate or determine an appropriate transmission rate for the DSL circuit of interest in response to the attenuation value and the determined EWL. For example, when the attenuation value A is greater than a predetermined attenuation value for the determined EWL the transmission rate may be decreased or vice versa.

In step 110, the main controller 37 may store the determined EWL value in the loop facility assignment center system 44, as stated above.

The above-described steps are meant to be an illustrative example, the steps may be performed synchronously or in a different order depending upon the application. Also, although the above-described steps are performed in conjunction with installation of a customer site, they may be performed during other conditions and situations.

The present invention provides a nonintrusive cost-effective technique of determining an EWL of a DSL circuit utilizes existing DSL circuit devices. The present invention determines EWL using ADSL frequencies, thus, as described above, accurately determining EWL.

The above-described apparatus, to one skilled in the art, is capable of being adapted for various purposes and is not limited to control systems or other communication systems. The above-described invention may also be varied without deviating from the spirit and scope of the invention as contemplated by the following claims.

What is claimed is:

1. A controller comprising:
an input to receive data regarding a first attenuation signal and to receive data regarding a second attenuation signal, wherein the first attenuation signal is generated in response to a communication signal sent by a remote terminal transceiver to customer premises equipment, wherein the customer premises equipment generates the first attenuation signal and the first attenuation signal is a downstream signal, and wherein the remote terminal transceiver generates the second attenuation signal and the second attenuation signal is an upstream signal; and
a processor to determine an equivalent working length of a digital subscriber line circuit based on the first attenuation signal and based on the second attenuation signal, wherein the processor averages a first attenuation value determined from the first attenuation signal and a second attenuation value determined from the second attenuation signal to determine a combined attenuation value and wherein the processor determines the equivalent working length based on the combined attenuation value.

2. The controller of claim 1, wherein the controller indicates an error signal when a first attenuation value detennined from the first attenuation signal is greater than a predetermined attenuation value.

3. The controller of claim 1, wherein the processor determines that a loop error exists, a filter is missing or operating inappropriately, or a bridge tap exists on the at least one digital subscriber line circuit based on the combined attenuation value.

4. The controller of claim 1, wherein the processor adjusts a transmission rate between the customer premises equipment and the remote terminal transceiver based on the equivalent working length.

5. The controller of claim 1, wherein the processor determines a desired transmission rate of the at least one digital subscriber line circuit based on the first attenuation signal.

6. The controller of claim 1, wherein detern-iining the equivalent working length comprises determining an approximately 26-gauge cable representation of the at least one digital subscriber line circuit.

7. The controller of claim 1, wherein determining the equivalent working length comprises determining an unshielded twisted pair (UTP) cable representation of the at least one digital subscriber line circuit.

8. The controller of claim 1, wherein the data regarding the first attenuation signal is determined by monitoring attenuation measurements.

9. The controller of claim 1, wherein the data regarding the first attenuation signal is determined by monitoring approximately 100 KHz attenuation measurements.

10. The controller of claim 1, further comprising an output to send the equivalent working length to a loop facility assignment center system.

11. The controller of claim 10, wherein the loop facility assignment center system stores equivalent working length values for a plurality of DSL circuits.

12. A method comprising:

receiving data regarding a downstream attenuation signal at a controller, wherein the downstream attenuation signal is generated by customer premises equipment in response to a communication signal sent by a remote terminal transceiver to the customer premises equipment; receiving data regarding an upstream attenuation signal at the controller, wherein the remote terminal transceiver generates the upstream attenuation signal; and determining at the controller an equivalent working length (EWL) of a digital subscriber line circuit according to a linear closed form expression based on an attenuation value determined from the downstream attenuation signal and an attenuation value determined from the upstream attenuation signal.

13. The method of claim 12, wherein the linear closed form expression is $$EWL = C1 + C2 \times A,$$

with C1 being approximately −0.662, C2 being approximately 0.338, and A being the attenuation value determined from the downstream attenuation signal.

14. A controller comprising:

an input to receive data regarding a downstream attenuation signal and an upstream attenuation signal, wherein the downstream attenuation signal is generated by customer premises equipment in response to a communication signal sent by a remote terminal transceiver to the customer premises equipment and wherein the remote terminal transceiver generates the upstream attenuation signal; and a processor to determine an equivalent working length of a digital subscriber line circuit according to a linear closed form expression based on an attenuation value determined from the downstream attenuation signal and an attenuation value determined from the upstream attenuation signal.

* * * * *